Oct. 1, 1963  D. R. HENSON  3,105,389
MECHANICAL BELTING
Filed June 7, 1961  2 Sheets-Sheet 1
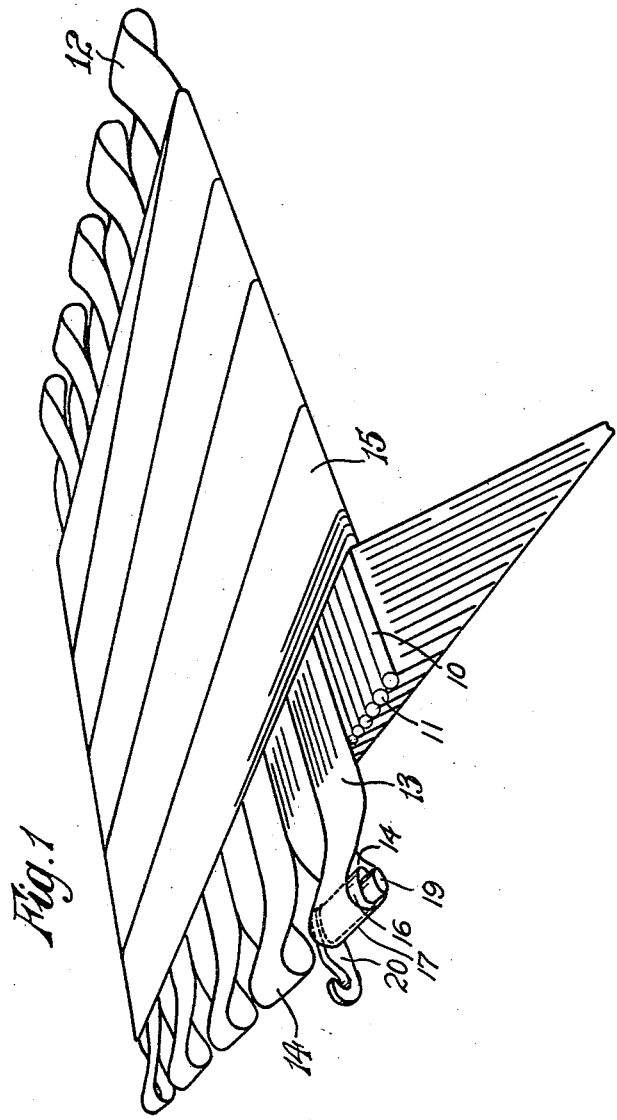
Inventor
Douglas Ronald Henson
by Benj. T. Rauber
his attorney

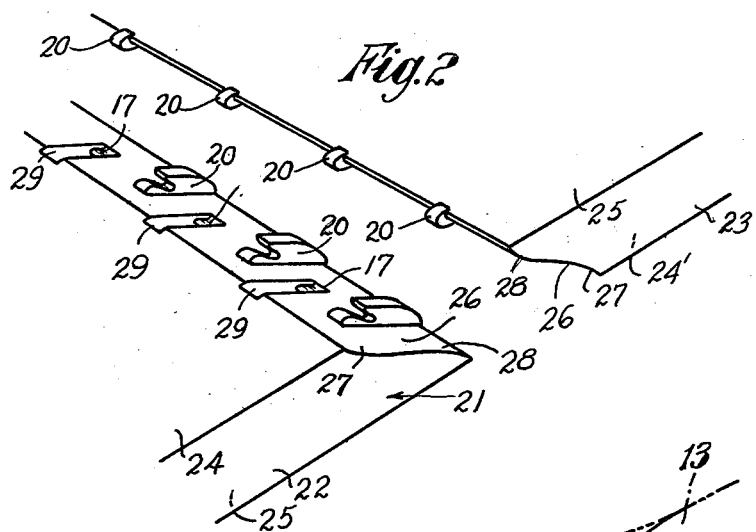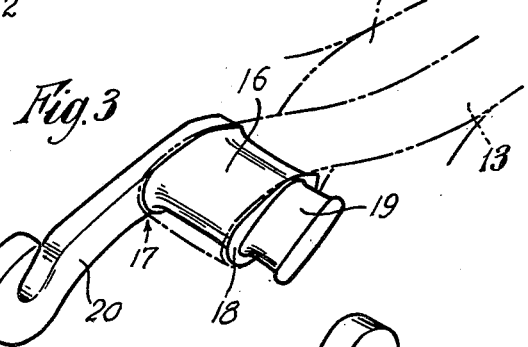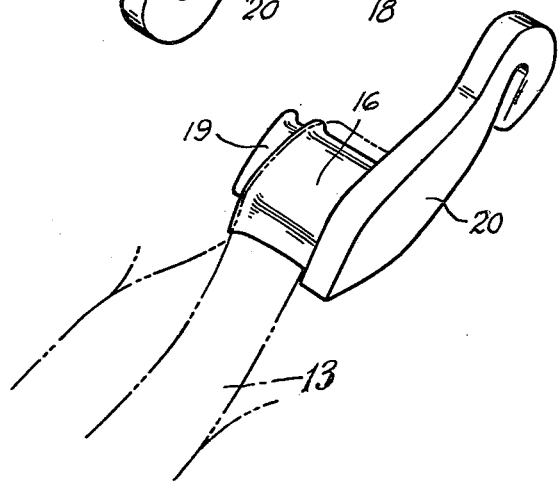

United States Patent Office 3,105,389
Patented Oct. 1, 1963

3,105,389
MECHANICAL BELTING
Douglas Ronald Henson, Walmley, Sutton Coldfield, England, assignor to Dunlop Rubber Company Limited, London County, England, a British company
Filed June 7, 1961, Ser. No. 115,357
Claims priority, application Great Britain June 29, 1960
12 Claims. (Cl. 74—231)

This invention relates to mechanical belting in the form of segments a number of which can be joined together to make longer belts and is a modification of the belting described in my copending application Ser. No. 807,825, filed April 21, 1959.

Said co-pending application Ser. No. 807,825 describes and claims a belting segment which comprises an elastomeric composition reinforced with substantially parallel unwoven longitudinal cords arranged to form a plurality of transversely perforated linking members disposed at each end of the segment and at least one layer of substantially parallel unwoven cords arranged transversely of the said longitudinal cords.

In my present invention, each section of belting comprises a sheet of elastomeric composition having longitudinally extending reinforcing cords which are formed into loops at each end of the segment to receive and hold fastening members by means of which successive segments are secured end to end to form a continuous belting. Between the loops the cords lie side by side in a flat plane.

In effect a ribbon of cords rubberized with the elastomeric material in side-by-side formation in a single ply is laid in a length from one end to the other of the segment and then turned reversely in an open loop in which the ribbon is shifted transversely of the segment and is then laid in a reverse direction alongside the edge of the first length and formed into a loop at the opposite end whereupon the process is repeated successively to form a flat ply of cords of the segment reinforcement with transversely spaced loops at each end, the loops at one end being staggered relative to those at the other end. The longitudinally extending reinforcing cords receive and sustain the tension stresses of the belting assembled from the segments.

To hold the longitudinally extending cords from displacement and strengthen the ply transversely, a ply of rubberized cords is laid transversely on one surface of the ply of longitudinal cords thence about the edges and on the other side. This ply may be formed from a continuous ribbon as in the ply of the longitudinally extending cords, it being understood that no loops are formed, the cords turning closely about the side edges of the ply of longitudinally laid cords to form selvedges.

Each fastening member comprises a shank extending through a loop of the cord reinforcement, an anchoring stub projecting beyond one side of the loop and a hook extending forwardly from the other end of the shank so that it may engage a stub of a fastening member of the next segment of an assembled belt.

As the loops at one end of each segment are staggered relatively to the next succeeding segment, the hook of one segment is positioned to engage the anchoring stub of the next segment. Equal tension is thus applied to the ends of the shank so that all of the longitudinally extending cords are under equal tension in use.

To complete the segment the reinforcement is enveloped in a mass of unvulcanized elastomeric material except for the hook portions and anchoring stubs of the fastening members and the elastomeric material is molded and cured to bond the elastomeric material to the reinforcement. The surfaces of the cured elastomeric envelope lie in flat parallel planes on opposite sides of the reinforcement and the ends are at an acute angle to these surfaces so that when assembled the end edge of one segment overlaps the adjacent end edge of the next segment.

The hooks of the fastening members project from the end surfaces of the envelope and recesses are formed in the end surfaces about the anchoring stubs so that the hooks of one segment may be inserted into these recesses of an adjacent end of a segment to be locked thereto, the ends being complementary to each other. Preferably the slots or bights of the hook portions of the fastening members extend inwardly from the mouth or open end at an angle to the end surface of the segment so that in joining two segments, the anchor stubs are drawn inwardly and the contacting surfaces of the ends are pressed together.

Preferably the end surfaces of each segment are slightly concave, viewed on a longitudinal plane, from the edge joining the flat surface of the segment at an obtuse angle and convex at the opposite edge. The anchoring stub is preferably provided with shoulders at its ends to keep the anchoring members from chafing the elastomeric envelope as the segments are bent about a roller or other rounded surface.

The elastomer may be a vulcanized natural or synthetic rubber, gutta percha balata or other elastomeric plastic of suitable properties. The reinforcing cords may be of any suitable textile fibre or filament such as cotton, rayon, nylon or dacron or of metal and may be a monofil, a strand of filaments or a cord of several strands.

The invention is illustrated by way of example in the accompanying drawings, in which:

FIG. 1 is a perspective view of a reinforcement for a segment embodying the invention and showing the arrangement of the cord structure and the positioning of the fastening members, FIG. 2 is a perspective view of the adjacent ends of two segments in position to be joined end-to-end, and, FIG. 3 is a perspective view of a pair of fastening members showing their relative positions as they are about to be engaged.

Referring to FIG. 1, a reinforcement for a segment comprises a length of ribbon 10 of rubberized cords side-by-side extending in a flat plane from one end 11 to a loop 12 in which it is turned reversely to form a second length 13 in the same plane as the length 10 to a loop 14 in which it is turned reversely to a third length, this construction being repeated until a segment reinforcement of the required width is formed.

In the specific embodiment of the invention shown in FIG. 1, seven steel wire cords are covered with a vulcanized rubber composition and placed side by side to form a ribbon 13. Each steel wire cord contains 38 strands of steel wire of 0.0058 inch diameter arranged with three central strands surrounded with five sets of seven wires each having one central wire surrounded symmetrically by six strands. The total diameter of the cord is 0.05 inch, its breaking load 364 lbs. and 276 feet of the cord weigh 1 lb.

It will be apparent that the width of the ribbon is seven times 0.05 inch, or 0.35 inch or somewhat more if the cords are not tightly abutting but separated by a film of the elastomer or flexible plastic composition in which the reinforcement is to be enveloped.

The ribbon 13 is wound to form a helix which is then flattened so that coils of the helix all lie in the same plane and form a substantially flat sheet of rubberized steel cords having a series of loops 14 at each end, the spatial disposition of the loops being complementary at each end. Above and below the flat sheet another ribbon 15 of rubberized steel cords of lighter construction is wound to form a transverse flattened helix, the cords crossing those of the first helix at an angle of about 80 degrees and crossing each other in the upper and lower layers at an angle of about 20 degrees.

The shank 16 of a combined hook and anchor stub fastening member 17 such as that shown in FIG. 3 is then passed through each loop, a shoulder 18 adjacent an anchoring stub 19 preventing displacement of the edge cords of a ribbon 13 from the shank on to the pin portion. A hook 20 extends from the other end of the shank forwardly from the shank.

The reinforcement thus formed is enveloped in an envelope 21 of a vulcanizable natural rubber composition by applying sheets of compounded unvulcanized rubber. The assembly is then vulcanized in a mould by application of heat and pressure, to form a belting segment having recesses containing the anchor stubs 19 in the end surfaces, from which the hook portions 20 of the fastening members project.

FIG. 2 shows the adjacent ends of two segments 22 and 23 in the positions they occupy just prior to being hooked together. As shown in FIG. 2, the envelope 21 of segment 22 has an upper flat surface 24 and a lower flat surface 25 parallel to the upper surface and an end surface 26 which slopes from the upper surface to the lower surface. Preferably, as shown in segment 22 the end surface is concavely curved in an arc 27 at the upper edge and curved convexly as at 28 to its under edge. The shank and a portion of the hook of the fastening member are enclosed in the envelope of flexible plastic material with the outermost, rounded, end of the hook at the lower edge in segment 22. The recess or bight of each hook is at the mid-portion of the end surface as shown in segment 22 and slants downwardly toward the edge surface. Segment 23 is inverted relatively to segment 22 with the surface 25', corresponding to surface 25 of segment 22 uppermost and surface 24' corresponding to surface 24 of segment 22 lowermost and the end surface complementary to end surface 26 of segment 22.

Recesses 29, as shown in segment 22 are formed between successive hooks of the end of each segment to expose the anchoring stubs of the fastening members so that the hook portion of one segment may enter into the recess of an adjoining segment to engage the anchoring stub of a fastening member therein. The downward slant of the bight of the several hooks causes the edge surfaces of the joining segments to be drawn tightly together so that the upper and lower surfaces of successive segments form respectively continuous even surfaces and also acts to hold the segments together when not in tension.

A belt was assembled from a number of these segments by engaging the corresponding hooks and anchor pins.

The joints between the segments of the belt were found to be substantially as strong as the belting segments themselves and the assembled belt had a high tensile strength and a high tear resistance. In addition the joints were substantially waterproof, no seepage through the belting taking place. The joints were of similar thickness to the rest of the belt.

This belt was suitable for a wide range of uses but when a similar belt having a greater or lesser degree of "troughing" is required this can be provided by making belts in which the angle at which the transverse cords cross the longitudinal cords is varied.

Having now described my invention, what I claim is:

1. A belting segment comprising a sheet of flexible plastic material having a plane upper surface and a plane lower surface parallel to said upper surface, and end surfaces inclined to said upper and lower surfaces, and recesses spaced transversely in said end surfaces, a reinforcement enveloped in and bonded to said flexible plastic material and comprising a ribbon formed of cords placed side-by-side and formed into transversely aligned and transversely spaced loops at each end of said segment with the loops at one end staggered transversely relative to the loops at the opposite end with the openings in said loops aligned transversely of said segment, said ribbon extending edge-to-edge in a flat plane from the loops at one end of said segment to the loops at the opposite end thereof, and fastening members, one for each said loop, each having a shank in one of said loops, an anchoring stub extending from one end of said shank into one of said recesses at the end of said sheet of flexible plastic material and a hook extending from the other end of said shank through the end of said sheet of flexible plastic material in position to engage an anchoring stub in the end of an adjoining segment.

2. The belting segment of claim 1 in which said inclined end surface makes an acute angle with one of said plane surfaces and an obtuse angle with the other plane surface and in which said recesses extend inwardly from said plane surface and said end surface at the edge where said end surface joins said plane surface at an obtuse angle to encompass the anchoring stub projecting into said recess and said hooks extend from the opposite edge of said end surface in position to slide into a recess of an adjoining segment in a direction inwardly from the plane surface of said segment to engage an anchoring stub in said recess.

3. The belting segment of claim 2 in which said hooks open from the end toward the plane surface, making an obtuse angle with said plane surface.

4. The belting segment of claim 3 in which the opening in said hook slants downwardly towards the inclined end surface of said segment.

5. The belting segment in claim 2 in which said inclined end surface, viewed on a longitudinal plane is concave at the edge making an obtuse angle with said plane surface and convex at the edge making an acute angle with the opposite plane surface.

6. The belting segment of claim 1 to which said shank of said fastening member has a shoulder at the end opposite said hook to retain a loop on said shank.

7. The belting segment of claim 1 in which the end surfaces of said segment are slanted in parallel directions to make an acute angle with one plane surface at one end and an acute angle with the other plane surface at the opposite end.

8. The belting segment of claim 1 in which the longitudinal cords of said ribbons comprise strands of metallic filaments.

9. The belting segment of claim 1 in which said flexible material is a vulcanized rubber composition.

10. The belting segment of claim 1 comprising a ply of cords extending transversely of and adjacent to each flat surface of the ply of longitudinally extending cords assembly and about the outer side edges of said assembly.

11. The belting segment of claim 10 in which said transverse cords are at an angle of between 60 degrees and 90 degrees to the longitudinal cords.

12. The belting segment of claim 1 in which the flexible plastic composition is plasticized polyvinyl chloride.

References Cited in the file of this patent

UNITED STATES PATENTS 2,554,372    Mathieu _____ May 22, 1951
2,799,177    Henson _____ July 16, 1957

FOREIGN PATENTS 712,116    Great Britain _____ July 21, 1954